Nov. 29, 1966  H. J. HALL  3,287,926
METHOD OF MAKING AND HARVESTING ICE
Filed June 17, 1964
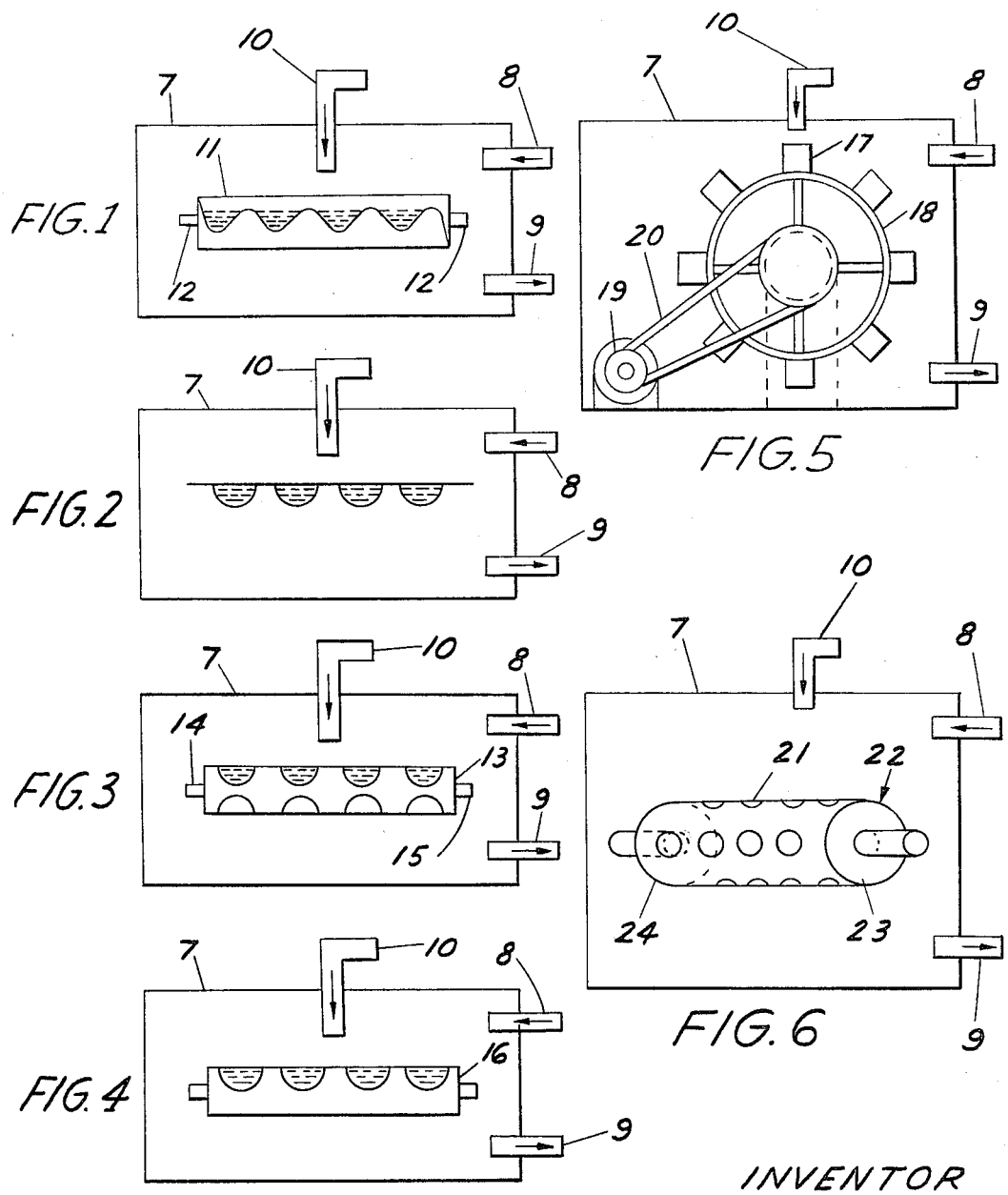
INVENTOR
HENRY J. HALL
BY Edward M. Apple
ATTORNEY United States Patent Office 3,287,926
Patented Nov. 29, 1966

3,287,926
METHOD OF MAKING AND HARVESTING ICE
Henry J. Hall, Detroit, Mich.
(25210 Circle Drive, Southfield, Mich.)
Filed June 17, 1964, Ser. No. 375,716
2 Claims. (Cl. 62—71)

This invention relates to the making and harvesting of ice, particularly ice cubes for domestic use, although the method herein disclosed also may be employed with larger equipment for commercial applications.

In Patent No. 3,075,365, previously issued to me, and in my co-pending patent application Serial No. 229,944, field October 11, 1962, now Patent Number 3,163,019, I disclose certain apparatus which may be employed in practicing the method herein disclosed and claimed, nevertheless the method herein disclosed may be practiced in a limited manner with other apparatus when used under the conditions herein described.

An object of this invention is to practice the method of freezing ice and then harvesting the same in a dry condition.

Another object of this invention is to provide a method of freezing and harvesting ice, without changing the physical state of the ice after it is once frozen, except to shrink its volume with a continued application of the refrigerant medium after freezing.

Another object of the invention is to provide a method of freezing and harvesting ice cubes, in which the circulation of the refrigerant is maintained at a constant temperature during both the freezing cycle and the harvesting cycle.

Another object of the invention is to provide a continuous method of freezing and dry harvesting ice cubes, in which there is no change of temperature in the apparatus used to freeze the cubes, except such temporary change of temperature that may be caused by the induction to the apparatus of a new supply of liquid to be frozen.

The apparatus disclosed in my issued Patent No. 3,075,-365, and in my co-pending patent application, Serial No. 229,944, filed October 11, 1962, now Patent Number 3,163,019, may be employed to freeze and harvest the ice cubes in two different ways.

The first way is clearly disclosed in the Patent No. 3,075,365, and the co-pending application, Serial No. 229,944, filed October 11, 1962 now Patent Number 3,-163,019, wherein the induction of a new supply of water into the upper tray in used to release the ice cubes in the inverted tray. This is done by means of the conduction of heat from the newly introduced water through the walls of the tray to he ice in the inverted tray.

That method is satisfactory, and is made possible because of the peculiar wall structure of the tray as previously disclosed. That method, however, of necessity employs a wet operation in harvesting ice.

The method just described also may be practiced to a limited degree with other types of trays and apparatus now known to the public as hereinafter described.

The apparatus disclosed in the Patent No. 3,075,365, and the co-pending application, Serial No. 229,944, now Patent Number 3,163,019, may be employed however, in a second and unobvious method of harvesting the ice in a dry condition. It is the latter method, however, which I particularly desire to disclose and claim in this application.

It is a well known fact that ice will shrink in volume when subjected to a continued, well below freezing, temperature. It is that principle which I employe in practicing the method herein disclosed. The instant method will harvest the ice from the apparatus fo the Patent No. 3,075,365, and co-pending application No. 229,944, filed October 11, 1962 now Patent Number 3,163,019, in a dry condition. No other apparatus now known to the public can be so effectively employed to dry harvest the ice, because the refrigerating medium, cold air in this instance, can not be made to contact uniformly all sides and walls of the ice containers, such as is possible with my apparatus, because of its peculiar construction, as previously disclosed.

Although I prefer to use cold air as the freezing and harvesting refrigerant, it will be understood that other types of refrigerants may be employed in this method, so long as the refrigerant is brought into uniformly direct contact with the walls of the ice container. For example, it is within the contemplation of this invention to make he undulating walls of my apparatus hollow, so that a liquid refrigerant may be passed from end to end of the ice container.

It is also within the contemplation of the invention to use a non-reversible uniformly conductive tray positioned in a cold air refrigerant. This type of apparatus, however, would be objectionable in that it would be difficult to use it in a continuous operation, as is possible with the applicant's previously disclosed reversible or invertible apparauts.

Applicant's method of freezing and dry harvesting of the ice cubes might also be practiced with a reversible apparauts, having ice cube molds on either side thereof, and arranged to pass a liquid refrigerant through the interior of such apparatus, or around the outside thereof in a manner that the liquid refrigerant would uniformly contact the walls of each ice cube mold to freeze the ice cubes and dry harvest the same when the apparatus inverted.

It is also within the contemplation of the invention to have an apparatus in which the ice cube molds are formed on one side of the tray with a liquid refrigerant flowing through the tray, and all in the presence of cold, circulating air arranged to uniformly contact the walls of the molds for freezing the ice when upright and for dry harvesting the ice when the device is inverted.

Several different types of apparatus for practicing my method are diagrammatically illustrated in the drawings however, I do not intend to be limited to any particular form of structure in practicing the method herein disclosed and claimed.

The foregoing and other objects and advantages of the invention will become more apparent as the disclosure proceeds, reference being made from time to time to the accompanying drawings, forming part of the within disclosure, in which drawings:

FIG. 1 is a diagrammatic view of a preferred form of the device with a reversible tray, suitable for practicing the invention method herein disclosed.

FIG. 2 is a modified form of device for practicing the method in which a fixed tray is used.

FIG. 3 is a still further modified form of apparatus which may be used in practicing the method.

FIG. 4 is another modified form of device which may be employed.

FIG. 5 is a still further modified form of device.

FIG. 6 is a still further modified form of device which may be employed.

Referring now more particularly to the drawings, it will be understood that in the embodiment disclosed in FIG. 1, the reference character 7 indicates an airtight receptacle, having a refrigerated air inlet 8, and a refrigerated air outlet 9, a source of water supply 10, and a reversible tray 11, constructed and arranged as disclosed in Patent No. 3,075,365, previously issued to me, and as employed in my co-pending application, Serial No. 229,944, filed October 11, 1962 now Patent Number 3,163,019.

The tray 11 is preferably formed, and is supported for rotation on means 12, as previously disclosed by me, and may be inverted with power, as previously disclosed, or it may be manually inverted by any suitable means.

Although I prefer the combination and arrangement as disclosed in FIG. 1, it will be understood that the method may be practiced in a limited way by the use of a tray constructed as shown in FIG. 2. Such a tray may be fixed, or it may be invertible, so long as the molds therein are surrounded on all sides by the liquid refrigerant, which in this instance is refrigerated air.

The freezing and harvesting apparatus may also take the form as shown in FIG. 3, wherein ice molds are formed on either side of a receptacle 13, which is provided with a refrigerant inlet 14, and a refrigerant outlet 15. In such a structure a liquid refrigerant may pass from end to end through the receptacle 13, and uniformly contact the inside walls of the ice cube molds to effect the freezing and shrinking of the ice cubes in the molds.

In FIG. 4 I illustrate another modified form similar to that shown in FIG. 3, except in this instance the receptable 16 has ice molds only on one side thereof.

In FIG. 5 I show another modified form of apparatus which may be used on the interior of the receptable 7, shown in FIG. 1. In this embodiment the ice molds 17 are carried on a Ferris wheel 18, which is rotated by means of a motor 19, and belt 20. It will be understood that the structure of FIG. 5 will be housed inside the cold air container 7, shown in FIG. 1.

In FIG. 6 I show another modified form of apparatus which may be used. In this embodiment the ice molds 21 are formed in the wall of a cylindrical member 22, which is closed at either end, as at 23 and 24, each end 23 and 24 being provided with connections for the flow of a liquid refrigerant through the cylinder. It will be understood that this device would also be housed in a refrigerated, airtight receptacle, as shown at 7, in FIG. 1.

In the preferred form of structure, shown in FIG. 1, the interior of the receptacle 7 is always provided with a constant flow of refrigerated air, having a temperature well below the freezing point of water. In practicing this method, the air temperature in the receptacle 7 is uniform, which of course, effects a uniform temperature on all the walls and parts of the reversible tray 11, so that after the new water supply is introduced to the reversible tray 11, it is quickly frozen. During the introduction of a new supply of water to the tray 11, the temperature of the walls of the tray is changed very little, by the introduction of the new supply of water to the tray 11, and is quickly restored to the low operating temperature. After the freezing cycle is completed the tray 11 is slowly rotated so that the ice cubes formed in the upper portion of the tray are then rotated toward the bottom of the receptacle 7. As the cold refrigerated air continues to pour in and out of, and uniformly contact all the walls of the ice molds, the ice cubes therein will continue to be affected by the refrigerated air and will shrink in volume, so that they may be discharged or harvested in a dry state from the bottom of the tray when it is reversed. When the ice cubes are dry harvested from the reversible tray 11, the empty tray will return for another charge of water to complete the cycle.

The other forms of the device illustrated herein will function, in a similar manner, to freeze the ice cubes, and shrink the ice cubes after freezing, so that they may be harvested in a dry state, with power or manually, as hereinabove described.

The method herein disclosed obviously employs the principle of freezing ice on one side of the tray and dry harvesting the ice on the opposite side of the tray, by using a common medium, which in this instance is the circulation of refrigerated air in, around, and below the tray, in such a manner as to affect all of the walls of the molds. After the freezing of the ice, the continued circulation of refrigerated air, which contacts all of the walls of the molds, acts to shrink the ice cubes within the molds thereby breaking the bond between the ice and the mold walls, so that the cubes are free to fall by gravity when the tray is inverted, thus providing a dry harvest. This is possible because the rate of contraction of the ice is greater than the thermal contraction of the mold material.

The method described and claimed function because the wall area of each cavity holding ice is the refrigerated surface area (this is true whether I use indirect refrigeration, as shown in FIGS. 1, 2 and 5, or use direct refrigeration, as shown in FIGS. 3, 4 and 6), each of the cavities always remains below the freezing temperature of water, while at the same time the open area of each cavity is subjected to circulating air.

The result is that all of the cavity walls break bond with the ice because the ice shrinks in volume on all sides equally, and at the same time, and further because the rate of contraction of the metal and ice is different, with the result that the ice cubes will fall free from the molds as they are inverted.

This method is all practiced without any change of state in the air, without changing the temperature of the tray, except slightly upon the introduction of a new charge of water, and without melting the ice to any degree after it has been frozen.

In practicing this method, the temperature of the refrigerant affecting the tray is, of course, set to a lower degree than would be required when harvesting the ice cubes by the water conduction method previously described in my co-pending application. The temperature of the air surrounding the tray will of course depend upon the amount of water introduced to the molds of the tray, and the time cycle at which the tray is inverted and righted.

In practicing the invention with the machine, as shown in FIG. 1, the air temperature is held at approximately ten degrees, and the tray temperature is set to invert at approximately twelve degrees. The tray temperature by the time the water is frozen solid, may go to approximately twenty-five degrees temperarily, but is rapidly reduced to twelve degrees, as the tray continues to be subjected to the ten degree air circulation all about it. The ten degree air to which the tray and the ice is continuously subjected causes the shrinking of the ice cubes in the molds, so that the ice will fall free of the molds, in a perfectly dry state, when the tray is inverted.

It is believed that the operation of the method is obvious from the foregoing description.

Having described my invention, what I claim, and desire to secure by Letters Patent is:

1. The method of freezing and dry harvesting ice, which consists providing a container of water, enclosing said container in an air tight space, and simultaneously subjecting all parts of said container to a constant flow of refrigerant at a constant temperature well below the freezing point of water, freezing the water and thereafter maintaining said refrigerant uniformly in contact with all walls of said container while maintaining said refrigerant at said constant temperature and shrinking the volume of the ice equally on all sides simultaneously for harvesting.

2. The method of claim 1 including the repeated steps of inverting said container to remove the ice from said container, re-inverting said container, and recharging said container with fresh water.

References Cited by the Examiner

UNITED STATES PATENTS

| 3,039,277 | 6/1962 | Frei et al. | 62—71 |
| 3,075,365 | 1/1963 | Hall | 62—349 X |
| 3,180,103 | 4/1965 | Frohbieter | 62—135 |
| 3,180,105 | 4/1965 | Frohbieter | 62—353 X |

ROBERT A. O'LEARY, *Primary Examiner.*

MEYER PERLIN, *Examiner.*

N. R. WILSON, *Assistant Examiner.*